United States Patent [19]

Mims

[11] Patent Number: 4,818,419

[45] Date of Patent: Apr. 4, 1989

[54] METHOD OF REMOVING CLOGGING MATERIAL FROM A CLOGGED GRANULAR FILTER MEDIUM

[75] Inventor: Ken Mims, Lake Monroe, Fla.

[73] Assignee: Uddo-Mims International, Inc., Edgewater, Fla.

[21] Appl. No.: 110,111

[22] Filed: Oct. 19, 1987

Related U.S. Application Data

[63] Continuation-in-part of Ser. No. 714,034, Mar. 20, 1985, Pat. No. 4,707,277.

[51] Int. Cl.$^4$ .......................... B01D 37/04; C02C 1/20
[52] U.S. Cl. ..................... 210/796; 210/806; 210/269; 210/270; 134/10; 15/340.1
[58] Field of Search ..................... 134/167, 169 R, 10; 210/767, 780, 791, 792, 805, 806, 269, 270, 796; 137/264, 267; 209/12, 421; 15/302, 340; 141/231; 280/5 D

[56] References Cited

U.S. PATENT DOCUMENTS

| 2,010,538 | 8/1935 | Evans | 210/241 |
| 2,964,191 | 12/1960 | Arnold et al. | 210/241 |
| 4,490,162 | 12/1984 | Davis | 15/340 |

FOREIGN PATENT DOCUMENTS

| 1584914 | 11/1969 | Fed. Rep. of Germany | 210/270 |
| 2414563 | 10/1975 | Fed. Rep. of Germany | 210/270 |
| 2800628 | 7/1979 | Fed. Rep. of Germany | 210/270 |

*Primary Examiner*—Richard V. Fisher
*Assistant Examiner*—Wanda L. Millard
*Attorney, Agent, or Firm*—Frijouf, Rust & Pyle

[57] ABSTRACT

A method of cleaning and removing clogging material from a clogged granular filter medium of a granular filter device is disclosed. A collector is positioned proximate the clogged filter medium for collecting the clogged filter medium together with a portion of the water contained within a tank housing the clogged granular filter medium. An input of a first pump is connected in fluid tight communication with the collector. A conduit is connected in fluid tight communication with an output port of the first pump. The conduit is connected to a reservoir. The clogged granular filter medium and the portion of water is pumped by the first pump from the tank of the granular filter device such that a slurry of clogged granular filter medium flows from the granular filter device through the collector, first pump and conduit towards the reservoir such that during the transit through the collector, first pump and conduit the clogged granular filter medium is agitated causing an intergranular frictional action among the clogged granular filter medium thereby loosening the clogging material from the granular filter medium to form a suspension of loosened clogging material and entrained granular filter medium. The granular filter medium is separated from the suspension of loosened clogging material by conveying granular filter medium angularly relative to the reservoir thereby permitting the suspension of loosened clogging material and granular filter medium to be conveyed away from the first opening of the separator towards a second opening of the separator, so that the suspension of loosened clogging material drains back towards the first opening thereby separating the granular filter medium from the suspension of loosened clogging material to form a cleaned granular filter medium. The cleaned granular filter medium is collected from the second opening of the separator and transported back to the granular filter device.

11 Claims, 1 Drawing Sheet

METHOD OF REMOVING CLOGGING MATERIAL FROM A CLOGGED GRANULAR FILTER MEDIUM

RELATED APPLICATION

This application is a continuation-in-part of Ser. No. 714,034 filed Mar. 20, 1985, which is now U.S. Pat. 4,707,277 and is incorporated by reference as if fully set forth herein.

BACKGROUND OF THE INVENTION

1. Field of the Invention

This invention relates to a method and an apparatus for removing clogging material from clogged granular filter medium of a granular filter device. More specifically, this invention relates to a method and an apparatus for removing the clogging material from the granular filter medium of a final granular water filter utilized in water purification.

2. Information Disclosure Statement

The present invention is applicable to water treatment filter devices of the type which utilize a granular filtering medium. Examples of granular filtering mediums include anthracite, activated charcoal, pumice stone, expanded clay, sand, gravel, etc., including multi-medium combinations thereof. Present granular filters utilize a periodic backwash process to remove particulate material clogging the granular filtering medium. The backwash process requires a major flow of a backwash fluid in a direction reverse that of the normal filtering operation. Generally, the backwash flow passes upwardly through the granular filter medium. Whereas the raw fluid which is to be filtered is introduced into the upper portion of a tank which contains the filtering medium and flows downwardly through the granular filtering medium wherein the entrained liquid and/or solid impurities are removed by the action of the filtering medium.

During the backwash process a substantial portion of the granular filter medium is entrained within the backwash flow along with the loosened clogging material. In order to retain the entrained filter medium, the level of the outflow channel is positioned at a point where the least amount of entrained filter medium is lost and the greatest amount of loosened clogging material is removed for a given rate of flow of the backwash. The problem with this type of backwash process is that when the process terminates, the clogging material which was not discarded with the backwash fluid falls back onto the granular filter medium.

The present invention overcomes the aforementioned inadequacies of the prior art by the provision of a collector disposed within the granular filter device for collecting the clogged granular filter medium and a portion of the water from the tank housing the clogged granular filter medium and water and pumping the clogged granular filter medium and water such that an aqueous slurry is formed and flows from the filter device to a reservoir thereby causing the clogged granular filter medium to be agitated resulting in an intergranular frictional action of the clogged granular filter medium such that the clogging material is loosened from the granular filter medium such that a suspension of loosened clogging material and entrained granular filter medium is formed. When the suspension of loosened clogging material and entrained granular filter medium enters the reservoir, the entrained granular filter medium settles to the bottom of the reservoir. The settled granular filter medium is conveyed by a separator for separating the granular filter medium from the suspension of clogging material. A means for transporting the granular filter medium to the tank housing the granular filter medium repositions the cleaned granular filter medium in the tank of the granular filter device.

It is an object of the present invention to provide a method to clean and remove clogging material from an aqueous slurry of clogged granular filter medium of a granular filter device such that the cleaned granular filter medium may be reused in the granular filter device.

Another object of the present invention is to provide a method with an apparatus to clean and to remove clogging material from the granular filter medium used in a granular filter device by agitating the clogged granules forming the granular filter medium.

Another object of the present invention is to provide a method with an apparatus to clean and to remove the clogging material lodged in the pores or voids between granules forming the granular filter medium.

Another object of the present invention is to provide a method of removing impurities or clogging material attached to the granular filter medium from the granular filter medium positioned in the interior of the tank containing the granular filter medium without the expenditure of large amounts of time or backwash liquid.

Another object of the present invention is to provide a method with an apparatus to clean and to remove clogging material such as particulate matter from the granular filter medium used in a granular filter device to purify raw water.

Another object of the present invention is to provide a method and apparatus to clean and to remove clogging material from the granular filter medium used in a granular filter device in order to prolong the use of the granular filter medium.

Another object of the present invention is to provide a method and apparatus to clean and to remove clogging material fromthe granular filter medium used in a granular filter device where the filter device includes a pressure granular filter or an open gravity granular filter.

Another object of the present invention is to provide a method with an apparatus which agitates the clogged granular filter medium thereby resulting in an intergranular frictional action of the clogged granular filter medium to thereby loosen the clogging material from the granular filter medium used in a granular filter device.

Another object of the present invention is to provide a method with an apparatus to clean and remove the clogging material from the granular filter medium of a granular filter device which remains notwithstanding a backwash of the filter.

In the past, when particulate matter or the like has accumulated in the pores or voids between the granular filter medium of a granular filtering device, the particulate matter positioned between the granular filter medium was only partially removed by backwashing the granular filter medium.

A need has existed in the art for a method for removing such build-up of particulate matter in the voids within the granular filter medium other than backwashing the clogged granular filter medium.

The present invention provides a method and an apparatus which may be completely self contained, mobile and which enables an operating crew to remove the clogging particulate material from the clogged granular filter medium of a granular filer device while preventing the loosened clogging material from repositioning itself at the top of the filter at the end of the cleaning process.

The granular material can be sand, stone, anthracite, and the like which is positioned within a filter device. Such granular filter devices are used in water purification (tertiary treatment) and in waste water treatment. In water purification the granular filter medium is present in the final filter and may be sand to remove the turbidity or charcoal to remove color and/or taste impurities.

SUMMARY OF THE INVENTION

The invention is defined by the appended claims with a specific embodiment shown in the attached drawings. For the purpose of summarizing the invention, the invention may be incorporated into a method of cleaning and removing clogging material from a clogged granular filter medium of a granular filter device. The method comprises the steps of positioning a collector proximate the clogged filter medium to collect the clogged filter medium together with a portion of the water contained within a tank of the granular filter device housing the clogged granular filter medium. An input of a first pump is connected with the collector. A conduit is connected with an output port of the first pump. The conduit is connected to a reservoir means. Preferably, all connections are made in fluid tight communication. The clogged granular filter medium and the portion of water are pumped from the granular filter device such that a slurry of clogged granular filter medium flows from the granular filter device through the collector, first pump and conduit towards the reservoir such that during the transit through the collector, first pump and conduit the clogged granular filter medium is agitated causing an intergranular frictional action among the clogged granular filter medium thereby loosening the clogging material from the granular filter medium to form a suspension of loosened clogging material and entrained granular filter medium. The entrained granular filter medium settles out within the reservoir such that the granular filter medium settles toward an outlet of the reservoir. The granular filter medium is separated from the suspension of loosened clogging material by conveying the granular filter medium angularly relative to the reservoir thereby permitting the suspension of loosened clogging material and granular filter medium to be conveyed away from the first opening of the separator towards a second opening of the separator, such that the suspension of loosened clogging material drains back towards the first opening and the granular filter medium is separated from the loosened clogging material and conveyed towards the second opening for discharge therefrom. The suspension of loosened clogging material is preferably discharged from the reservoir. The cleaned granular filter medium is collected from the second opening of the separator. The cleaned granular filter medium is transported back to the granular filter device.

The invention may also be incorporated into a method of cleaning clogging material from a clogged granular filtering medium of a granular filter device comprising the steps of providing an apparatus, comprising a collector means for collecting the clogged granular filter medium together with a portion of water contained within a tank housing the clogged granular filter medium of the filter device. A first pump means having an input and an output port, the input port being in preferably fluid tight communication with the collector means is used for pumping and removing the clogged granular filter medium out of the filter device together with the portion of water. A conduit means is in preferably fluid tight communication with the output port of the first pump means. The conduit means conducts the removed clogged granular filter medium and water from the first pump means away from the filter device. A reservoir means include an inlet and an outlet. The inlet of the reservoir means is connected to the conduit means in preferably fluid tight communication for receiving the suspension of clogging material and entrained granular filter medium. Preferably, the reservoir means defines a chamber having opposed sloping sidewalls which slope towards each other from the inlet to the outlet such that as the suspension of clogging material and entrained granular material enter the reservoir means through the inlet, turbulent energy of the suspension of clogging material and entrained granular material is rapidly dissipated permitting the entrained granular material to settle towards the outlet.

A separation means include a first and a second opening. The first opening of the separation means is disposed adjacent to and in fluid communication with the outlet of the reservoir means. The separator means extend angularly relative to the reservoir means.

Preferably, the separation means is an Archimedean screw separation conveyor having a first and a second opening. The first opening of the conveyor is disposed adjacent to and in fluid communication with the outlet of the reservoir means. The separation conveyor extends angularly relative to the reservoir means.

Most preferably, the separation means is an Archimedean screw conveyor for separating the granular material from the suspension of clogging material which further includes an elongate housing defining a first and second opening. The housing extends angularly relative to the reservoir means and the housing is disposed, preferably, at an angle of substantially 18 degrees to the horizontal. An elongate axle is rotatably supported by and extends through and along the length of the housing with the axle having a first and a second end. The first end of the axle is disposed adjacent to the outlet of the reservoir means. The spiral conveyor means is rigidly secured to the axle. The spiral conveyor means is disposed within the housing and extends between the first and second opening of the housing such that when the axle and spiral conveyor means rotate within the housing, granular material and the suspension of clogging material are conveyed upwardly along the housing from the first opening towards the second opening. The granular material continues upwardly until discharged from the second opening. The suspension of clogging material separates and flows downwardly along the housing towards the first opening.

A cleaning operation of loosening and removing the clogging material from the granular filtering medium of the filter device comprises positioning the collector proximate the clogged granular filter medium for collecting the clogged granular filter medium and a portion of water contained within a tank housing the clogged granular filter medium. The clogged granular filter medium and the portion of water are pumped from the granular filter device such that a slurry of clogged granular filter medium flows from the granular filter device through the collector, first pump and conduit towards the reservoir such that during the transit through the collector, first pump and conduit the clogged granular filter medium is agitated causing an intergranular frictional action among the clogged granular filter medium thereby loosening the clogging material from the granular filter medium to form a suspension of loosened clogging material and entrained granular filter medium. The granular filter medium is settled within the reservoir such that the granular filter medium settles towards the outlet of the reservoir. The settled granular filter medium is separated from the suspension of loosened clogging material by the Archimedean screw separation conveyor or, most preferably, by the Archimedean screw conveyor which conveys the granular material and loosened clogging material angularly relative to the reservoir at an angle of substantially 18 degrees to the horizontal thereby permitting the suspension of loosened clogging material and granular filter medium to be conveyed away from the first opening of the separator towards a second opening of the separator, such that the suspension of loosened clogging material drains back towards the first opening and the granular filter medium is separated from the loosened clogging material and conveyed towards the second opening for discharge therefrom. The suspension of loosened clogging material is preferably discharged from the reservoir by a second pump means. The cleaned granular filter medium is collected from the second opening of the separator. The cleaned granular filter medium is transported back to the tank of the granular filter device. The suspension of loosened clogging material comprises an aqueous fluid with particles of clogging material dispersed or mixed in the fluid. It is believed that the particles of clogging material are lighter and/or hydrated to a greater extent than the granular medium and therefore remain in suspension easier than the granular medium to enable separation of the granular medium from the suspension of loosened clogging material. However, this is a theoretical explanation and the inventor does not consider himself bound by it as the only explanation.

The foregoing has outlined rather broadly the more pertinent and important features of the present invention in order that the detailed description that follows may be better understood so that the present contribution to the art can be more fully appreciated. Additionally, features of the invention will be described hereinafter which form the subject of the claims of the invention. It should be appreciated by those skilled in the art that the conception of the specific embodiment disclosed may be readily utilized as a basis for modifying or designing other apparatus for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention reference should be had to the accompanying drawings in which.

Similar reference characters refer to similar parts throughout the several views of the drawings.

DETAILED DESCRIPTION

Figure 1:
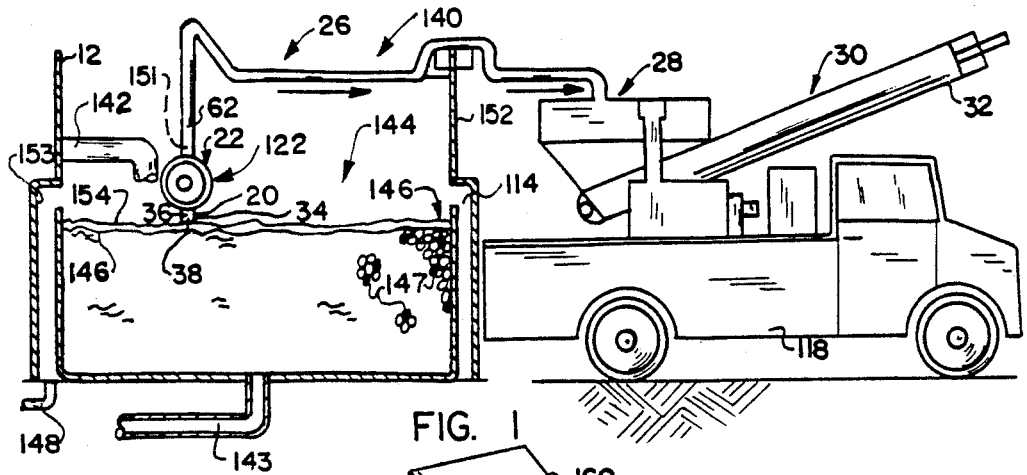
FIG. 1 is a diagrammatic representation partly in section of a granular filter device and an apparatus for removing clogged granular material from the granular filter device according to the present invention.

FIG. 1 is a diagrammatic representation partly in section of an apparatus for removing clogged granular filter medium 146 from a tank 152 of a granular filter device 140 according to the present invention. The granular filtration device 140 includes a circumferential rim 12 and is filled with clogged granular filter medium 146 to be removed from tank 152 in order to remove the clogging material 147. Clogged granular filter medium 146 is shown to have formed as the result of clogging material 147 lodged in the pores or voids between the granular filter medium generally designated 144. A collector generally designated 20 collects the clogged granular filter medium 146 from the tank 152 of the granular filter device 140. A first pump generally designated 22 pumps the removed clogged granular filter medium 146 together with a portion of water 154 held in tank 152. The amount of water is that amount which is sufficient to form an aqueous slurry of the clogged granular filter medium 146. An amount of water 154 which covers the clogged granular filter medium 146 in tank 152 is generally sufficient to enable the removal of the clogged medium 146 and the formation of a slurry of clogged granular filter medium 151 contained within the tank 152. Water may be added to the clogged granular filter medium in tank 152 during the process, if needed. The water used in the process is, preferably, previously cleaned, filtered water. A conduit, preferably flexible conduit, generally designated 26 conducts the clogged granular filter medium 146 and a portion of water 154 to a mobile reservoir generally designated 28. The pumping of the clogged granular filter medium 146 and the portion of water 154 from the granular filter device forms an aqueous slurry of clogged granular filter medium 151. The slurry 151 flows from the granular filter device 140 through the collector 20, first pump 22 and conduit 26 towards the reservoir 28 such that during the transit through the collector 20, first pump 22 and conduit 26 the clogged granular filter medium 146 is agitated causing an intergranular frictional action amont the clogged granular filter medium 146 thereby loosening the clogging material 147 from the granular filter medium 144 to form a suspension of loosened clogging medium 149 and entrained granular filter medium 145. The reservoir means 28 receives the suspension of loosened clogging material 149 and entrained granular filter medium 145 from conduit 26. The entrained granular filter medium 145 rapidly settles towards the bottom 29 of the reservoir 28 as granular filter medium generally designated 150 and is conveyed by a separator generally designated 30 which conveys the granular filter medium 150 within reservoir 28 together with the suspension of loosened clogging material 149 angularly upwardly towards a discharge opening 32.

More specifically, the collector means generally designated 20 is a pipe 34 having a proximal and a distal end 36 and 38 respectively. The proximal end 36 of the pipe 34 is in fluid tight communication with an input port 40 of the first pump generally designated 22. The distal end 38 of the collector 20 is movable relative to the clogged granular filter medium 146 disposed in the tank 152 of the granular filter device 140.

The granular filter device 140 includes a discharge pipe 143 which conducts filtered fluid from the filter device during normal filtering process. Pipe 143 conducts the backwash fluid, previously filtered fluid, upwardly in a direction reverse that of normal filtering, for backwashing the granular filter medium. Channel 153 receives the spent backwash fluid generated during the backwash process. Backwash drain 148 conducts the spent backwash fluid away from the filter device for further treatment as is known in the art. The design set forth in FIGS. 1 and 2 is merely illustrative of a granular filter device and is not intended to be restrictive as to the design or shape of filter device the method of the invention may be used.

Figure 2:
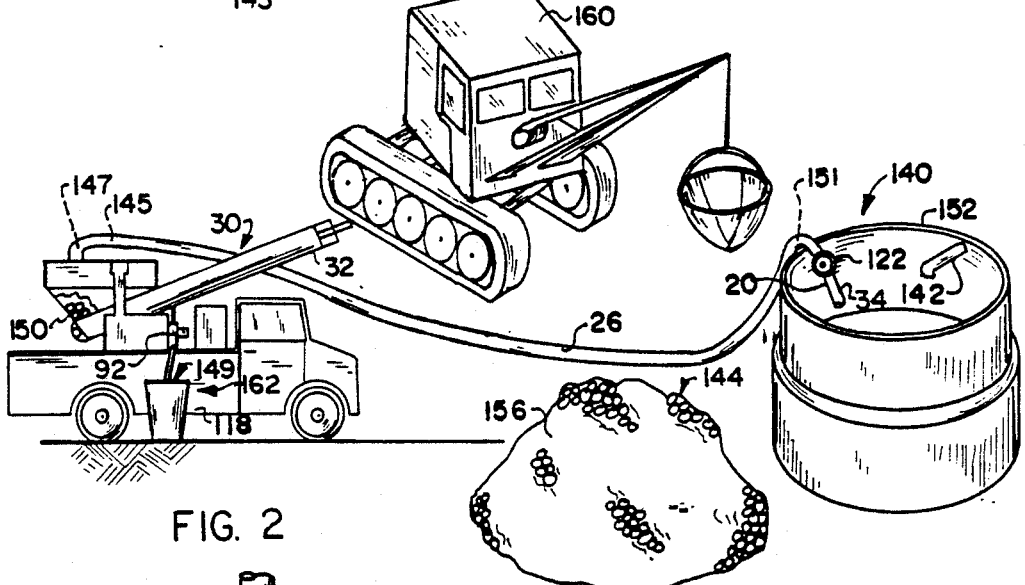
FIG. 2 illustrates the process in which the clogged filter medium is first removed, cleaned and transported back to the granular filter device.

FIG. 2 illustrates the process of the invention in which the clogged granular filter medium 146 is first removed from the granular filter device 140, cleaned by the method of the invention and transported back to the granular filter device 140 by crane 160 or the like. The suspension of clogging material 149 is pumped by second pump means 92 into disposal means 162 for further treatment. The cleaned granular filter medium 156 is placed on the surface of the ground prior to being replaced into the tank 152 of the granular filter device 140 by crane 160.

Figure 3:
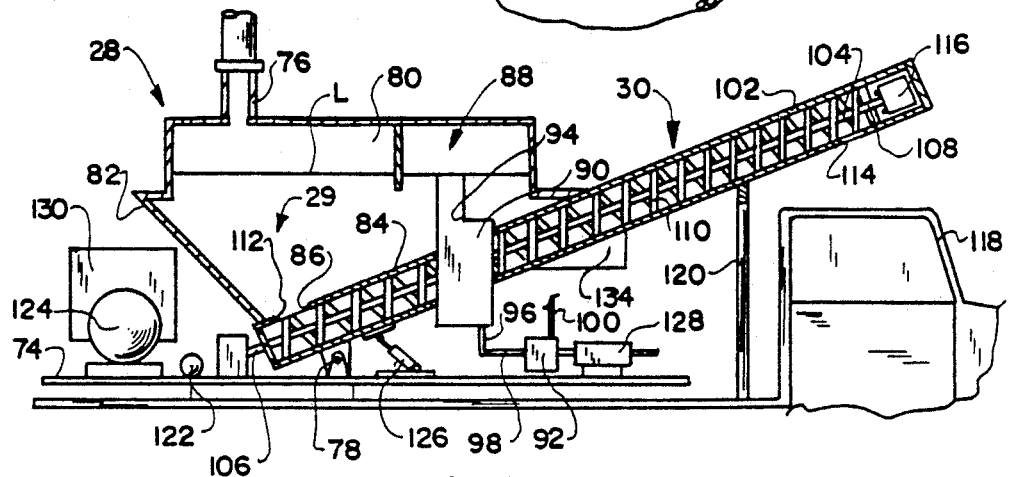
FIG. 3 is an enlarged fragmentary view partially in section of the mobile reservoir and the separator shown in FIG. 1.

The reservoir means generally designated 28 is preferably mobile and is shown in more detail in FIG. 3 and includes a mobile turntable 74 for permitting the reservoir means 28 to be rotated within a substantially horizontal plane such that an inlet 76 of the reservoir means 28 is selectively positioned adjacent to the granular filter device 140 and the second opening 114 of separator 30 may be positioned so as to drop the drained and cleaned granular filter medium 156 at a desired location such as on the surface of the ground or into the bed of another truck. Pivotal means generally designated 78 are disposed between the turntable 74 and the reservoir means 28 such that the reservoir means 28 is selectively positioned angularly relative to the turntable 74. The reservoir means 28 defines a chamber 80 which includes opposed sloping side walls 82 and 84 respectively which slope towards each other from the inlet 76 to the outlet 86 of the reservoir means 28 such that as the entrained granular filter medium 145 and suspension of clogging material 149 enters the reservoir means 28 through the inlet 76, turbulent energy of the entrained granular filter medium 145 is rapidly dissipated permitting the granular filter medium to settle towards the outlet 86 as settled granular filter medium 150. Weir means generally designated 88 extend into the chamber 80 for permitting the level L of the contents within the chamber 80 to be limited. An accumulator means 90 is disposed between the weir means 88 and a second pump means 92 for accumulating the suspension without the settled granular filter medium 150. The accumulator means 90 includes an entry port and an exit port 94 and 96 respectively. The entry port 94 is connected to the weir means 88 for permitting the suspension from the weir means 88 to flow to the accumulator means 90. A first flexible pipe 98 extends from the exit port 96 of the accumulator means 90 to the second pump means 92 and a second flexible pipe 100 extends from the second pump means 92 to enable the suspension of clogging material 149 to be pumped from the accumulator means 90 for proper waste disposal such as a waste drum 162.

As shown in FIG. 3, the separator means generally designated 30 is an Archimedean screw conveyor. The separator means 30 includes an elongate housing 102 which extends angularly relative to the reservoir means 28. An elongate axle 104 is rotatably supported by and extends through and along the length of the housing 102. The axle 104 includes a first and a second end 106 and 108 respectively with the first end 106 of the axle 104 being disposed adjacent to the outlet 86 of the reservoir means 28. A spiral conveyor means 110 is rigidly secured to the axle 104 such that the spiral conveyor means 110 is disposed within the housing 102. The conveyor means 110 extends between a first opening and a second opening 112 and 114 respectively of the separator means 30 such that when the axle 104 and the spiral conveyor means 110 rotate within the housing 102, granular filter medium 150 within the reservoir and suspension of clogging material 149 are conveyed upwardly along the housing 102 from the first opening 112 towards the second opening 114. The granular filter medium 150 within reservoir 28 continues upwardly until discharged from the second opening 114 and the suspension of clogging material 149 separated from the now cleaned granular filter medium 156 flows downwardly along the housing 102 towards the first opening 112. The separator means 30 also includes a hydraulic motor 116 which is drivingly connected to the second end 108 of the axle 104. The hydraulic motor 116 is driven by a hydraulic pump (not shown) which is powered by first motor 124.

As shown in FIGS. 1 and 3, a truck 118 rotatably supports the separator means 30 such that in use of the apparaus, the separator means 30 is rotated relative to the truck 118 so that the second opening 114 of the separator means 30 is disposed away from the truck 118 thereby permitting the removed and cleaned granular filter medium 156 to be dumped on the surface of the ground or into the bed of another truck for transporting by a crane 160 or the like into the tank 152 of the granular filter device 140. FIG. 3 shows support means 120 rigidly secured to the truck 118 for releasably supporting the housing 102 relative to the truck 118. An air accumulator 122 supplies compressed air to the first pump means 22 for operating the first pump means 22. The accumulator 122 is connected to an air compressor 130 secured to the truck 118 for suppling compressed air to the air accumulator 122. As is appreciated by one skilled in the art, the compressed air system may be substituted by a hydraulic pump system to drive hydraulic motors such as pump means 22 and 92.

The present disclosure includes that contained in the appended claims as well as that of the foregoing description. Although this invention has been described in its preferred from with a certain degree of particularity, it is understood that the present disclosure of the preferred form has been made only by way of example and that numerous changes in the details of construction and the combination and arrangement of parts may be resorted to without departing from the spirit and scope of the invention.

I claim:

1. A method of cleaning and removing clogging material from a clogged granular filter medium of a granular filter device comprising the steps of:
    providing an apparatus to remove and clean the clogged granular filter medium including a collector means, a first pump means having an input and an output port, the input port being in fluid tight communication with the collector means, a conduit means in fluid tight communication with the output port of the first pump means, a reservoir means having an inlet and an outlet, the inlet of the reservoir means being connected to the conduit means, a second pump means, an Archimedean screw conveyor further including an elongate housing defining a first and second opening, the housing extending angularly relative to the reservoir means an elongate axle rotatably supported by and extending through and along the length of the housing, the axle having a first and a second end, the first end of the axle being disposed adjacent to the outlet of the reservoir means, spiral conveyor means rigidly secured to the axle, the spiral conveyor means being disposed within the housing and extending between the first and second opening of the housing; and conducting a cleaning operation of loosening and removing the clogging material from the clogged granular filtering medium of the filter device comprising:

positionion the collector means proximate the clogged granular filter medium for collecting the clogged granular filter medium and a portion of water contained within a tank housing the clogged granular filter medium;

pumping the clogged granular filter medium and the portion of water from the granular filter device by the first pump means such that a slurry of clogged granular filter medium is formed and flows from the granular filter device through the collector means, first pump means and conduit means towards the reservoir means such that during the transit through the collector means, first pump means and conduit means the clogged granular filter medium is agitated causing an intergranular frictional action among the clogged granular filter medium thereby loosening the clogging material from the granular filter medium to form a suspension of loosened clogging material and entrained granular filter medium;

settling the granular filter medium within the reservoir means such that the granular filter medium settles towards the outlet of the reservoir means;

separating the granular filter medium from the suspension of loosened clogging material such that the separated granular filter medium is conveyed angularly relative to the reservoir by the Archimedean screw conveyor thereby permitting the suspension of loosened clogging material and granular filter medium to be conveyed away from the first opening of the separator towards a second opening of the separator, such that the suspension of loosened clogging material drains back towards the first opening and the granular filter medium is separated from the loosened clogging material and conveyed towards the second opening for discharge therefrom;

pumping the suspension of loosened clogging material from the reservoir by the second pump means;

collecting the cleaned granular filter medium from the second opening of the separator; and transporting the cleaned granular filter medium back to the tank of the filter device.

2. The method of claim 1 wherein the elongate housing of the Archimedean screw conveyor is disposed at an angle of substantially 18 degrees to the horizontal.

3. The method of claim 1 wherein the water contained within the tank housing the clogged filter medium is previously cleaned and filtered.

4. A method of cleaning and removing clogging material from a clogged granular filter medium of a granular filter device comprising the steps of:

positioning a collector proximate the clogged filter medium for collecting the clogged filter medium and a portion of the water contained within a tank housing the clogged granular filter medium and water;

connecting an input of a first pump in fluid tight communication with the collector;

connecting a conduit in fluid tight communication with an output port of a first pump;

connecting the conduit to a reservoir;

pumping the clogged granular filter medium and the portion of water from the granular filter device such that a slurry of clogged granular filter medium flows from the granular filter device through the collector, first pump and conduit towards the reservoir such that during the transit through the collector, first pump and conduit the clogged granular filter medium is agitated causing an intergranular frictional action among the clogged granular filter medium thereby loosening the clogging material from the granular filter medium to form a suspension of loosened clogging material and entrained granular filter medium;

settling the granular filter medium within the reservoir such that the granular filter medium settles toward an outlet of the reservoir;

separating the granular filter medium from the suspension of loosened clogging material such that the separated granular filter medium is conveyed angularly relative to the reservoir thereby permitting the suspension of loosened clogging material and granular filter medium to be conveyed away from the first opening of the separator towards a second opening of the separator, so that the suspension of loosened clogging material drains back towards the first opening and the granular filter medium is separated from the loosened clogging material and conveyed towards the second opening for discharge therefrom;

discharging the suspension of loosened clogging material from the reservoir;

collecting the cleaned granular filter medium from the second opening of the separator; and transporting the cleaned granular filter medium back to the granular filter device.

5. The method of claim 4 wherein the water contained within the tank housing the clogged filter medium is previously cleaned and filtered.

6. A method of cleaning and removing clogging material from a clogged granular filtering medium of a granular filter device comprising the steps of:

providing an apparatus to remove and clean the clogged granular filter medium including a collector means, a first pump means having an input and an output port, the input port being in fluid tight communication with the collector means, a conduit means in fluid tight communication with the output port of the first pump means, a reservoir means having an inlet and an outlet, the inlet of the reservoir means being connected to the conduit means, the reservoir means defining a chamber having opposed sloping sidewalls which slope towards each other from the inlet to the outlet, a separation means having a first and a second opening, the first opening of the separation means being disposed adjacent to and in fluid communication with the outlet of the reservoir means, the separator means extending angularly relative to the reservoir means; and conducting a cleaning operation of loosening and removing the clogging material from the granular filtering medium of the filter device comprising:

positioning the collector means proximate the clogged granular filter medium for collecting the clogged granular filter medium and a portion of water contained within a tank housing the clogged granular filter medium;

pumping the clogged granular filter medium and the portion of water from the granular filter device such that a slurry of clogged granular filter medium is formed and flows from the granular filter device through the collector, first pump and conduit towards the reservoir such that during the transit through the collector, first pump and conduit the clogged granular filter medium is agitated causing an intergranular frictional action among the clogged granular filter medium thereby loosening the clogging material from the granular filter medium to form a suspension of loosened clogging material and entrained granular filter medium;

settling the granular filter medium within the reservoir such that the granular filter medium settles towards the outlet of the reservoir;

separating the granular filter medium from the suspension of loosened clogging material such that the separated granular filter medium is conveyed angularly relative to the reservoir thereby permitting the suspension of loosened clogging material and granular filter medium to be conveyed away from the first opening of the separator towards a second opening of the separator, such that the suspension of loosened clogging material drains back towards the first opening and the granular filter medium is separated from the loosened clogging material and conveyed towards the second opening for discharge therefrom;

discharging the suspension of loosened clogging material from the reservoir;

collecting the cleaned granular filter medium from the second opening of the separator; and transporting the cleaned granular filter medium back to the tank of the filter device.

7. The method of claim 6 wherein the water contained within the tank housing the clogged filter medium is previously cleaned and filtered.

8. A method of cleaning and removing clogging material from a clogged granular filtering medium of a granular filter device comprising the steps of:

providing an apparatus to remove and clean the clogged granular filter medium including a collector means, a first pump means having an input and an output port, the input port being in fluid tight communication with the collector means, a conduit means in fluid tight communication with the output port of the first pump means, a reservoir means having an inlet and an outlet, the inlet of the reservoir means being connected to the conduit means, an Archimedean screw separation conveyor having a first and a second opening, the first opening of the conveyor being disposed adjacent to and in fluid communication with the outlet of the reservoir means, the separation conveyor extending angularly relative to the reservoir means; and conducting a cleaning operation of loosening and removing the clogging material from the granular filtering medium of the filter device comprising:

positioning the collector proximate the clogged granular filter medium for collecting the clogged granular filter medium and a portion of water contained within a tank housing the clogged granular filter medium;

pumping the clogged granular filter medium and the portion of water from the granular filter device such that a slurry of clogged granular filter medium is formed and flows from the granular filter device through the collector, first pump and conduit towards the reservoir such that during the transit through the collector, first pump and conduit the clogged granular filter medium is agitated causing an intergranular frictional action among the clogged granular filter medium thereby loosening the clogging material from the granular filter medium to form a suspension of loosened clogging material and entrained granular filter medium;

settling the granular filter medium within the reservoir such that the granular filter medium settles towards the outlet of the reservoir;

separating the granular filter medium from the suspension of loosened clogging material such that the separated granular filter medium is conveyed angularly relative to the reservoir by the Archimedean screw separation conveyor thereby permitting the suspension of loosened clogging material and granular filter medium to be conveyed away from the first opening of the separator towards a second opening of the separator, such that the suspension of loosened clogging material drains back towards the first opening and the granular filter medium is separated from the loosened clogging material and conveyed towards the second opening for discharge therefrom;

discharging the suspension of loosened clogging material from the reservoir;

collecting the cleaned granular filter medium from the second opening of the separator; and transporting the cleaned granular filter medium back to the tank of the filter device.

9. The method of claim 8 wherein the water contained within the tank housing the clogged filter medium is previously cleaned and filtered.

10. A method of cleaning and removing the clogging material from a clogged granular filtering medium for use in a raw water granular filter device comprising the steps of providing an apparatus including a collector means, a first pump means having an input and an output port, the input port being in fluid tight communication with the collector means, a conduit means in fluid tight communication with the output port of the first pump means, a reservoir means having an inlet and an outlet, the inlet of the reservoir means being connected to the conduit means, the reservoir means defining a chamber having opposed sloping sidewalls which slope towards each other from the inlet to the outlet, separation means having a first and a second opening, the first opening of the separation means being disposed adjacent to and in fluid communication with the outlet of the reservoir means, the separator means extending angu conducting a cleaning operation of loosening and removing the clogging material from the granular filter medium of the filter device comprising:

positioning the collector proximate the clogged granular filter medium for collecting the clogged granular filter medium and a portion of water contained within a tank housing the clogged granular filter medium;

pumping the clogged granular filter medium and the portion of water from the granular filter device by the first pump means such that a slurry of clogged granular filter medium is formed and flows from the granular filter device through the collector, first pump and conduit towards the reservoir such that during the transit through the collector, first pump and conduit the clogged granular filter medium is agitated causing an intergranular frictional action among the clogged granular filter medium thereby loosening the clogging material fromthe granular filter medium to form a suspension of loosened clogging material and entrained granular filter medium;

settling the granular filter medium within the reservoir such that as the entrained granular filter medium enter the reservoir means through the inlet, turbulent energy of the granular filter medium is rapidly dissipated permitting the granular filter medium to settle towards the outlet;

separating the granular filter medium from the loosened clogging material such that the separated granular filter medium is conveyed angularly relative to the reservoir thereby permitting the loosened clogging material and entrained granular filter medium to be conveyed away from the first opening of the separator towards a second opening of the separator, so that the loosened clogging material drains back towards the first opening and the granular filter medium is separated from the loosened clogging material and conveyed towards the second opening for discharge therefrom;

discharging the suspension of loosened clogging material from the reservoir by the second pump means;

collecting the cleaned granular filter medium from the second opening of the separtor; and transporting the collected cleaned granular filter medium back to the tank of the filter device.

11. The method of claim 10 wherein the water contained within the tank housing the clogged filter medium is previously cleaned and filtered.

* * * * *

UNITED STATES PATENT AND TRADEMARK OFFICE
CERTIFICATE OF CORRECTION

PATENT NO. : 4,818,419
DATED : April 4, 1989
INVENTOR(S) : Ken Mims

It is certified that error appears in the above-identified patent and that said Letters Patent is hereby corrected as shown below:

Column 6, line 48, delete "amont" and insert therefor --among--.
Column 9, line 23, delete "positionion" and insert therefor --positioning--.
Column 12, line 68, delete "angu-" and insert therefor --angularly relative to the reservoir means; and--.

Signed and Sealed this

Twenty-sixth Day of December, 1989

Attest:

JEFFREY M. SAMUELS

Attesting Officer     Acting Commissioner of Patents and Trademarks